US008020148B2

(12) United States Patent
Robertsson

(10) Patent No.: US 8,020,148 B2
(45) Date of Patent: Sep. 13, 2011

(54) BI-DIRECTIONAL PROBING AND TESTING OF SOFTWARE

(75) Inventor: Per-Ola Robertsson, Malmö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 686 days.

(21) Appl. No.: 10/428,733

(22) Filed: May 1, 2003

(65) Prior Publication Data

US 2004/0059962 A1 Mar. 25, 2004

Related U.S. Application Data

(60) Provisional application No. 60/412,834, filed on Sep. 23, 2002.

(51) Int. Cl.
*G06F 9/44* (2006.01)
(52) U.S. Cl. ........................................................ 717/124
(58) Field of Classification Search ........... 717/124–131
See application file for complete search history.

(56) References Cited

U.S. PATENT DOCUMENTS

| 5,191,646 | A | * | 3/1993 | Naito et al. ................. 717/125 |
| 5,202,955 | A | * | 4/1993 | Hamilton et al. ............. 706/52 |
| 5,317,740 | A | * | 5/1994 | Sites ........................... 717/129 |
| 5,581,695 | A | | 12/1996 | Knoke et al. |
| 5,604,841 | A | * | 2/1997 | Hamilton et al. ............. 706/11 |
| 6,003,143 | A | * | 12/1999 | Kim et al. ................... 714/38.13 |
| 6,202,199 | B1 | * | 3/2001 | Wygodny et al. ............. 717/125 |
| 6,212,650 | B1 | | 4/2001 | Guccione |
| 6,253,369 | B1 | * | 6/2001 | Cloud et al. ................. 717/136 |
| 6,282,701 | B1 | * | 8/2001 | Wygodny et al. ............. 717/125 |
| 6,301,657 | B1 | | 10/2001 | May |
| 6,324,683 | B1 | * | 11/2001 | Fuh et al. ................... 717/124 |
| 6,405,364 | B1 | * | 6/2002 | Bowman-Amuah .......... 717/101 |
| 6,412,106 | B1 | * | 6/2002 | Leask et al. ................. 717/124 |
| 6,502,209 | B1 | | 12/2002 | Bengtsson |
| 6,516,408 | B1 | * | 2/2003 | Abiko et al. ................. 712/227 |
| 6,826,432 | B2 | * | 11/2004 | Beck et al. .................. 717/126 |
| 6,934,934 | B1 | * | 8/2005 | Osborne et al. .............. 717/126 |
| 7,024,660 | B2 | * | 4/2006 | Andrade et al. .............. 717/124 |
| 7,043,717 | B2 | * | 5/2006 | Matsumoto et al. .......... 717/124 |
| 7,047,519 | B2 | * | 5/2006 | Bates et al. ................. 717/129 |
| 7,107,578 | B1 | * | 9/2006 | Alpern ....................... 717/124 |
| 7,111,281 | B2 | * | 9/2006 | Bates et al. ................. 717/129 |
| 7,134,115 | B2 | * | 11/2006 | Kawai et al. ................ 717/124 |
| 7,171,653 | B2 | * | 1/2007 | Albrecht ..................... 717/124 |
| 7,219,333 | B2 | * | 5/2007 | Agarwala et al. ............ 717/128 |
| 7,299,456 | B2 | * | 11/2007 | Bates et al. ................. 717/129 |
| 2001/0044902 | A1 | * | 11/2001 | Shavit ........................ 713/200 |
| 2004/0044993 | A1 | * | 3/2004 | Muller et al. ............... 717/124 |
| 2007/0022407 | A1 | * | 1/2007 | Givoni et al. ............... 717/124 |

FOREIGN PATENT DOCUMENTS

JP 07-056729 3/1995

OTHER PUBLICATIONS

"Dynamic Probe Class Library Programming Guide"; from: dpcl.sourceforge.net; No Author Listed; 15 pages; May 1, 2003.

* cited by examiner

*Primary Examiner* — Wei Zhen
*Assistant Examiner* — Junchun Wu

(57) ABSTRACT

Method and system are disclosed for bi-directional probing of software. The bi-directional probe is capable of transferring data to and from a software under test. This two-way transfer of data allows the variables and arguments in the software to not only be monitored, but also changed as needed. Test vectors may be developed and inserted into the software while running for testing purposes. Regression analysis may be made easier by using data from previous iterations as input for the next iterations.

16 Claims, 5 Drawing Sheets

BI-DIRECTIONAL PROBING AND TESTING OF SOFTWARE

CROSS-REFERENCE TO RELATED APPLICATION

This application for patent claims the benefit of priority from, and hereby incorporates by reference, U.S. Provisional Patent Application Ser. No. 60/412,834 entitled "Bidirectional Probing," filed with the U.S. Patent and Trademark Office on Sep. 23, 2002.

BACKGROUND OF THE INVENTION

1. Field of the Invention

The invention is related to testing of software and, in particular, to a method for bi-directional probing of software.

2. Description of the Related Art

Among developers of software, one of the most important requirements is for the software to be reliable. Reliability refers to the ability of a software to operate without failure for a specified amount of time in a specified environment. To ensure a sufficiently high level of reliability, software must be thoroughly tested and debugged prior to release. Usually, the entire software program as a whole is tested, as well as the individual functional components (e.g., function calls, subroutines) that make up the software program. Typically, test vectors are generated containing a series of values for the variables that are required by the software and/or one or more functional components thereof. The variable values are chosen to represent various types of usage conditions and environments in which the software is intended to be run. The test vectors are then applied to the software and/or the one or more functional components thereof, and the variable values are observed and recorded.

One type of testing that is often performed is called regression analysis, or sometimes verification testing. Regression analysis involves the selective retesting of a software that has been modified in order to fix known problems. The selective retesting is performed in order to ensure that the identified problems have been fixed, and that no other previously working functional components have failed as a result of the reparations. This type of testing is basically a quality control measure to ensure that the modified code still complies with its specified requirements and that any unmodified code has not been affected by the maintenance activity.

An important feature in regression analysis specifically and in software testing in general is the ability to observe the variable values resulting from the test vectors. Early attempts to observe the variable values of a software and/or the functional components thereof involved manually setting break points and other traps in the source code itself. More recently, software development tools such as Code Composer Studio™ from Texas Instruments and LabVIEW™ from National Instruments include software probes that may be inserted into the code under test. The software probes allow the variables in the code under test to be observed in real-time as the software is executed. These latter solutions, however, are based only on getting the variable values out from the code under test (e.g., so they can be analyzed). They do not allow the variable values to be changed during the execution of the software. In other words, presently existing software probes are only one-way or unidirectional probes in that the data is allowed to flow only from the code under test to the test system. They do not allow the direction of data transfer to be reversed so that data flows from the test system into the code under test.

Accordingly, it would be desirable to provide a way to probe software in a manner such that data may be transferred both out of as well as into the code under test.

SUMMARY OF THE INVENTION

Briefly, the present invention is directed to bi-directional probing of software. The bi-directional probe of the present invention is capable of transferring data to and from a software under test. This two-way transfer of data allows the variables in the software to not only be monitored, but also changed as needed. Test vectors may be developed and injected into the software while running for testing purposes. Regression analysis is made easier by using data from previous iterations as input for the next iterations.

In general, in one embodiment, the invention is directed to a method of testing software having a plurality of data variables and function arguments therein. The method comprises executing the software, identifying an address location for at least one of the variables or arguments used by the software, and outputting any data stored in the address location to a test system to thereby monitor the data. Data from the test system is then inputted into the address location to thereby replace any data previously stored in the address location.

In general, in another embodiment, the invention is directed to an apparatus for testing software having a plurality of data variables and function arguments therein. The apparatus comprises a central processing unit, and a storage unit connected to the central processing unit. The storage unit stores computer readable instructions for instructing the central processing unit to execute the software, identify an address location for at least one of the variables or arguments used by the software, output any data stored in the address location to the central processing unit to thereby monitor the data, and input data from the central processing unit into the address location to thereby replace any data previously stored in the address location.

In general, in yet another embodiment, the invention is directed to a system for testing software having a plurality of data variables and function arguments therein. The system comprises a device under test configured to execute the software including one or more probe instructions in the software, and a tester connected to the device under test. The tester is configured to control the device under test so that when a probe instruction is executed, the device under test: will identify an address location for at least one of the variables or arguments used by the software; output any data stored in the address location to the tester; and input data received from the tester into the address location.

It should be emphasized that the term comprises/comprising, when used in this specification, is taken to specify the presence of stated features, integers, steps, or components, but does not preclude the presence or addition of one or more other features, integers, steps, components, or groups thereof.

BRIEF DESCRIPTION OF THE DRAWINGS

A better understanding of the invention may be had by reference to the following detailed description when taken in conjunction with the accompanying drawings, wherein.

DETAILED DESCRIPTION OF THE INVENTION

Figure 1:
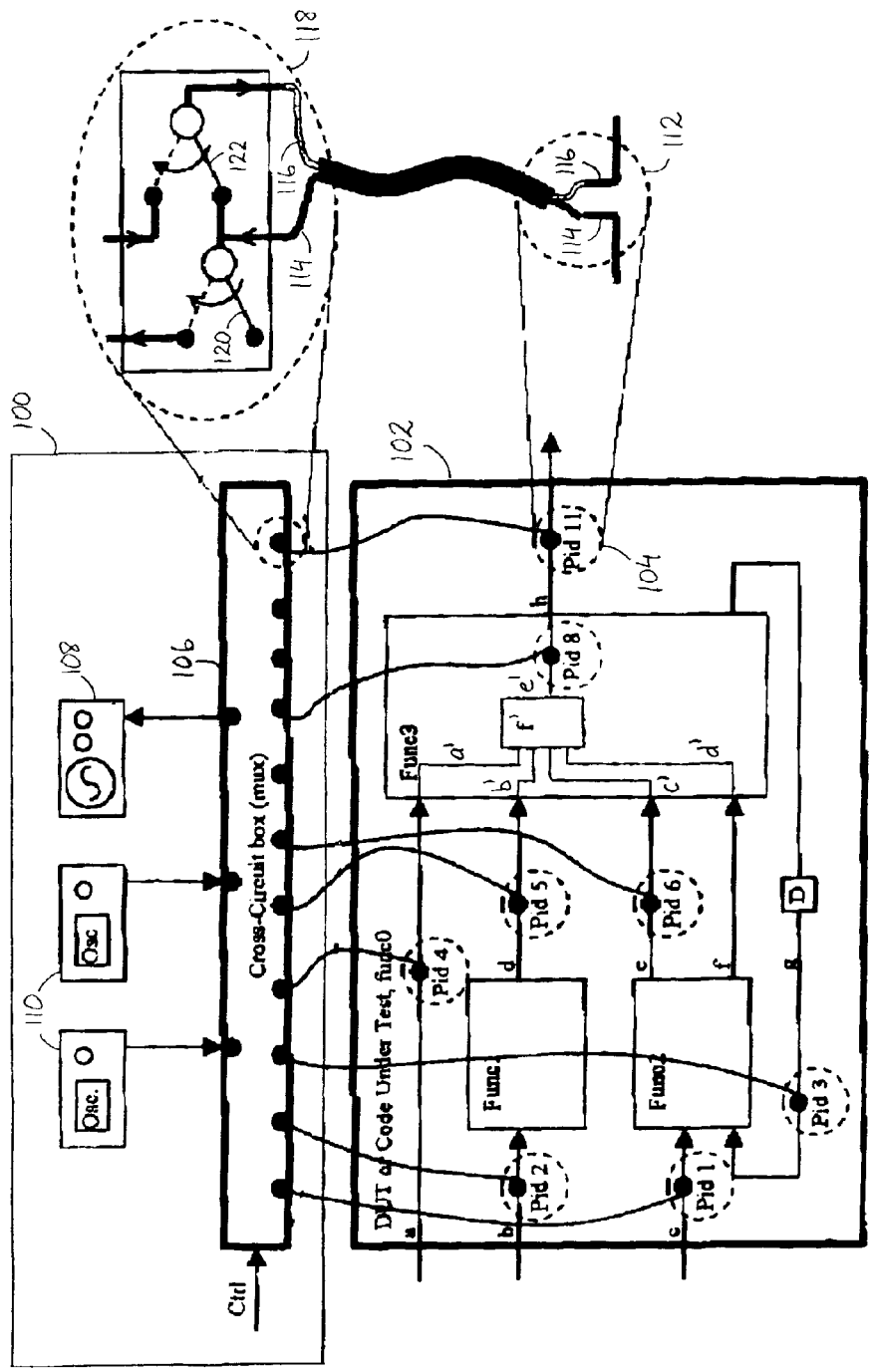
FIG. 1 illustrates an exemplary software testing environment according to embodiments of the invention using analogous hardware components.
Figure 2A:
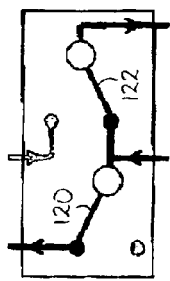
FIGS. 2A-2D illustrates exemplary operating modes of the bi-directional software probe according to embodiments of the invention using analogous hardware components.
Figure 2C:
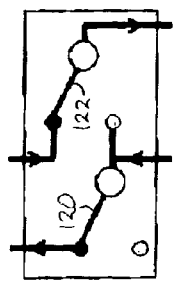
Figure 2B:
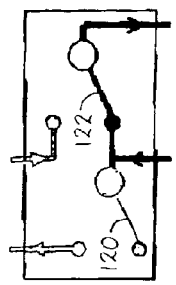
Figure 2D:
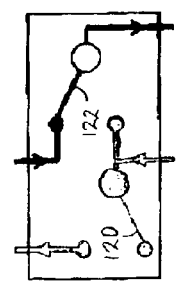

Following is a detailed description of the invention with reference to the drawings wherein reference numerals for the same and similar elements are carried forward.

Embodiments of the invention provide a method and system for testing software using bi-directional probes. The bi-directional probes of the invention may be inserted into the program code at essentially any location. The probes allow data to be captured from as well as injected into the software. Specifically, the probes allow the values of the variables in the software to be monitored, changed and inserted back into the software during execution. The software is then further executed with the changed values. The bi-directional probes of the invention may be implemented as a feature or a function in a software development tool such as Code Composer Studio™ from Texas Instruments and LabVIEW™ from National Instruments, or other similar software development environments.

The bi-directional software probing technique of the present invention is somewhat analogous to the testing of a hardware circuit board. Therefore, the invention will be described initially in terms of a test system for a hardware circuit board. This description is provided for illustrative purposes only, however, as the invention is actually directed to the probing of software.

FIG. 1 illustrates a hardware test system 100 that is analogous to the software testing tool in which the bi-directional probing technique of the present invention may be used. The hardware test system 100 is connected to a device under test (DUT) 102 via a plurality of hardware probes, one of which is indicated at 104. Each hardware probe 104 may be identified by its probe ID. For example, the first probe is PID 1, the second probe is PID 2, the third probe is PID 3, and so on. The probes 104 are connected to one side of a cross-circuit box 106, the other side of which is connected to one or more function generators 108, such as waveform generators, and one or more measurement units 110, such as oscilloscopes and wavemeters. The cross-circuit box 106 allows the probes 104 to be selectively connected to and disconnected from the function generators 108 and the measurement units 110 of the test system 100. A controller (not expressly shown) in the test system 100 provides a control signal that controls the connectivity of the cross-circuit box 106.

As can be seen, the probes 104 are strategically placed in order to allow the electrical signals at certain points of interest on the DUT 102 to be probed. For example, the first probe PID 1 is placed at the input of Func2 in order to allow electrical signal "a" to be probed. Likewise, the second probe PID 2 is placed at the input of Func1 in order to allow electrical signal "b" to be probed. The fifth probe PID 5, however, is placed at the output of Func1 in order to allow electrical signal "d" to be probed. The various functions (i.e., Func 1-3) may be any function that can be performed by the DUT (e.g., adding, subtracting, averaging, etc.). Some functions may have one or more internal and/or sub-functions therein that may also be probed. For example, Func3 has a sub-function "f" included therein that may be probed. In a manner similar to that described, the bi-directional probe of the present invention allows certain variables of interest in the software to be probed.

The connection point of each probe 104 to the DUT is analogous to a typical wired pair connection, shown in the dashed circle indicated by 112. As can be seen, one wire 114 of the wired pair 112 leads from the DUT 102 to the cross-circuit box 106, while the other wire 116 of the wired pair 112 leads from the cross-circuit box 106 back to the DUT 102. Similarly, the connection point of each probe 104 to the cross-circuit box 106 is analogous to a pair of switches, shown in the dashed circle indicated by 118. The inbound switch, indicated at 120, selectively connects the incoming wire 114 of a probe 104 to the tester system 100 (e.g., to a measurement unit). The outbound switch, indicated at 122, selectively connects the return wire 116 of a probe 104 to either the incoming wire 114 (e.g., for normal operation) or to the tester system 100 (e.g., to a function generator). The various modes of operation of the switches will be described in more detail below.

Referring now to FIGS. 2A-2D, the basic operating modes of the switches that connect the probes to the cross-circuit box are shown. These operating modes graphically illustrate the functional capability of the software probe of the present invention. In the first operating mode, shown in FIG. 2A, the inbound switch 120 and the outbound switch 122 are both disconnected from the cross-circuit box 106 and are connected to each other instead. This is the normal operating mode where data is neither flowing from the DUT 102 into the test system 100 or from the test system 100 into the DUT 102. In the second operating mode, shown in FIG. 2B, the inbound switch 120 connects the DUT 102 to the test system 100 while the outbound switch 122 is still connected to the inbound switch 120 (i.e., disconnected from the test system). This operating mode is used in order to obtain data from the DUT 102 for monitoring purposes. In the third operating mode, shown in FIG. 2C, the outbound switch 122 is connected to the test system 100, while the inbound switch 120 is disconnected from the test system 100. This operating mode is used for injecting data from the test system 100 into the DUT 102 for testing purposes. In the fourth operating mode, shown in FIG. 2D, both the inbound switch 120 and the outbound switch 122 are connected to the test system 100. This operating mode is used to obtain data from the DUT 102 for monitoring purposes as well as for inserting data into the DUT 102 for testing purposes. In a similar manner, the bi-directional probe of the present invention may be used to obtain data from the variables and arguments of a software program under test, input data into these variables and arguments, or both.

An exemplary block of programming code containing bi-directional probe instructions according to embodiments of the invention is shown in Example 1 below. As can be seen, the block of programming code is written in pseudocode and not in any particular programming language in order to emphasize the generic nature and applicability of the bi-directional probe. In the example, Func0 is the code under test and is analogous to the DUT 102 of FIG. 1. The "probe" instructions are analogous to the hardware probes PID 1-5 of FIG. 1, and typically include a probe ID as well as an indication of the variable or argument to be probed as arguments. For example, "probe(1,c)" refers to the first probe PID 1, and affects the address location corresponding to the variable "c" in the code under test. Thus, the probe instruction "probe(1, c)" allows the variable "c" in the block of programming code to be monitored and changed as needed. Likewise, the probe instruction "probe(4,a)" allows the variable "a" to be monitored and changed as needed, and so on.

Example 1

```
func0(a, b, c)
{
    probe(1, c)
    probe(2, b)
    probe(4, a)
    d = func1(b)
    probe(5, d)
    probe(3, g)
    e, f = func2(c, g)
    probe(6, e)
    h, g = func3(a, d, e, f)
    probe(11, h)
    return h
}
func3(a', b', c', d')
{
    e' = f'(a', b', c', d')
    probe(8, e')
    return e'
}
```

Note that Func3 has a sub-function "f'", the inputs to which are variables "a'"-"d'" and the output from which is variable "e'", corresponding to variables "a"-"d" and "h", respectively, of Func0. Sub-functions may also be probed using the bi-directional probing technique of the present invention.

By adding the probe instructions to the code under test, the software is observable and therefore testable. Any type of variable (e.g., automatic (temporarily stored on the stack), global, static, etc.) or any stored data may be probed so long as it is in the address space of the probe, as indicated by the variable in the probe instruction. It is also possible to probe function arguments using the bi-directional probe of the present invention. Probing the variables and function arguments makes it possible to further test the functionality of the software. Specifically, probing the variables and arguments of a function allows additional tests and test vectors to be developed based on the data obtained.

An exemplary C-code version of the probe instructions can be seen in the block of source code shown in Example 2 below. This example is provided to illustrate what an actual block of source code using embodiments of the invention might look like.

Example 2

```
// Calculates b * b + a
int func0(int a, int b)
{
    int d; int e;         // a reference to the variable is needed
    probe(2, &b);         // so that the value could be changed
    d = func1(b);         // this is the
    e = d + a;            // functionality of func 0
    probe(7, &e);
    return e;
}
int func1(int arg0)
{
    int res;
    res = arg0 * arg0;    // this is the functionality of func 1
    probe(8, &res);
    return res;
}
```

Figure 3:
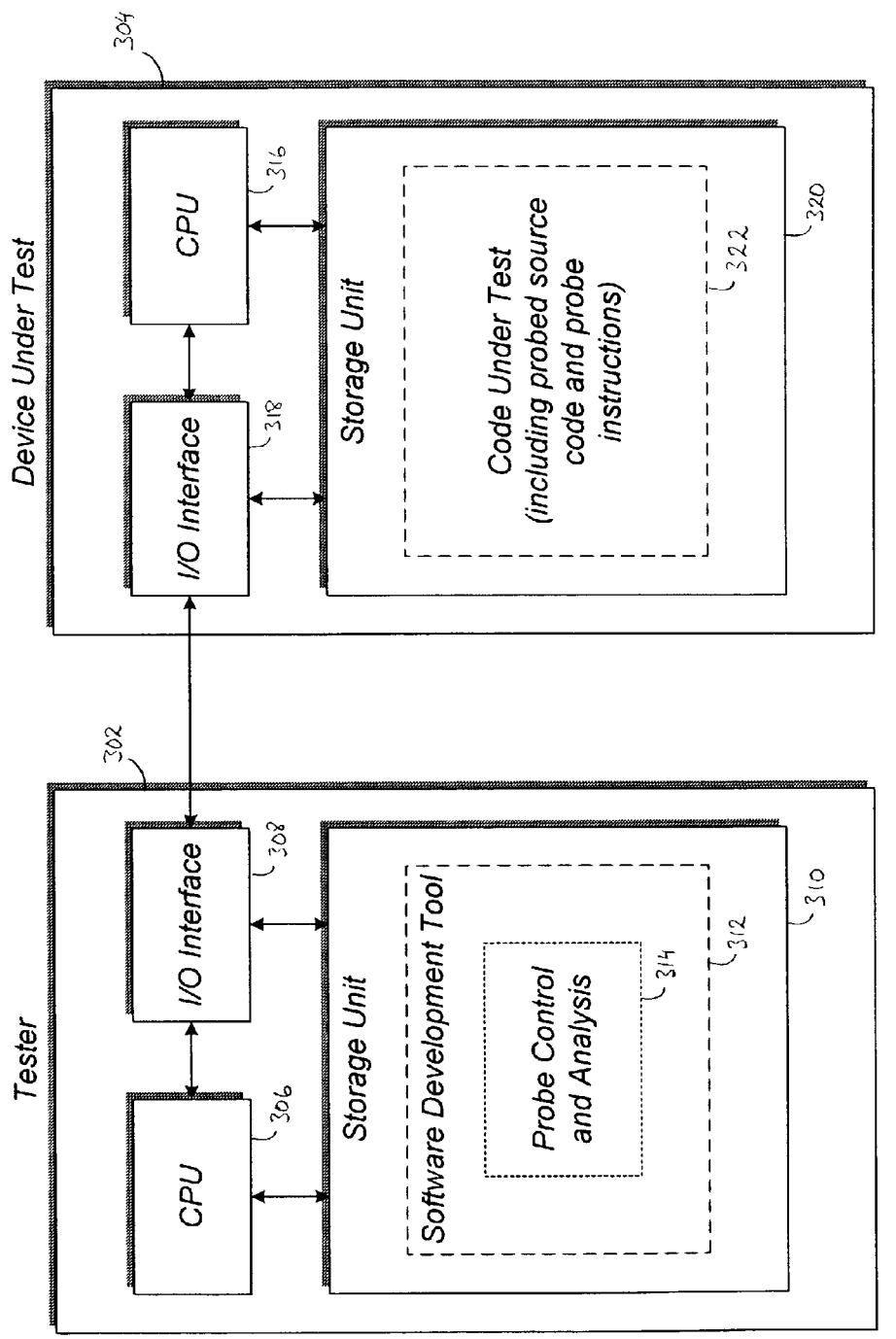
FIG. 3 illustrates an exemplary system in which the bi-directional software probe according to embodiments of the invention may be implemented.

The bi-directional probing technique of the present invention may be implemented in any test system. FIG. 3 shows an exemplary test system 300 for implementing the bi-directional probing technique. The test system 300 includes a tester 302 and a device under test 304 that are in communication with each other. The tester 302 is a typical computer that has a number of functional components, including a CPU 306, an input/output interface unit 308, and a storage unit 310. These components are well known to people of ordinary skill in the computer art and will therefore be described only briefly here. The CPU 306 handles the execution of all software programs on the tester 302, including the operating system and any software running thereon. The interface unit 308 serves to interface the tester 302 to the device under test 304, as well as any input/output devices (e.g., keyboard, mouse, display unit, printer, etc.) connected thereto. The storage unit 310 provides temporary storage (e.g., RAM) and/or long-term storage (e.g., hard drive) for any software programs and/or data that may be needed for the execution of the operating system and the software running on the tester 302.

Stored in the storage unit 310 are a number of software applications, including a software development tool 312. The software development tool 312 operates in the same way and has many of the same features as existing software development tools such as Code Composer Studio™ from Texas Instruments and LabVIEW™ from National Instruments, or other similar software development tools. In accordance with embodiments of the invention, however, the software development tool 312 further includes a probe control and analysis module 314. The probe control and analysis module 314 is capable of controlling the bi-directional probing of any software being tested using the software development tool 312, and analyzing the data being probed. Specifically, the probe control and analysis module 314 allows data to be captured from the code under test, injected into the code under test, or both, as determined by a user. The probe control and analysis module 314 also allows the user to generate test vectors based on the data obtained and to inject the test vectors back into the code under test. This makes it easier and more convenient for the user to monitor and test the operation and reliability of the code under test.

In the present embodiment, the code under test, including the bi-directional probe instructions, is executed on a separate unit, namely the device under test 304, that is in communication with the tester 302. The device under test 304, like the tester 302, is a typical computer that has a number of functional components, including a CPU 316, an input/output interface unit 318, and a storage unit 320. The components of the device under test 304 are similar in function to their counterparts in the tester 302 and will therefore not be described here. The main point is that the code under test 322, including the probed source code and the bi-directional probe instructions and implementation is stored and executed separately from the tester 302. (See the exemplary blocks of source code above for examples of probe instructions.)

Figure 4:
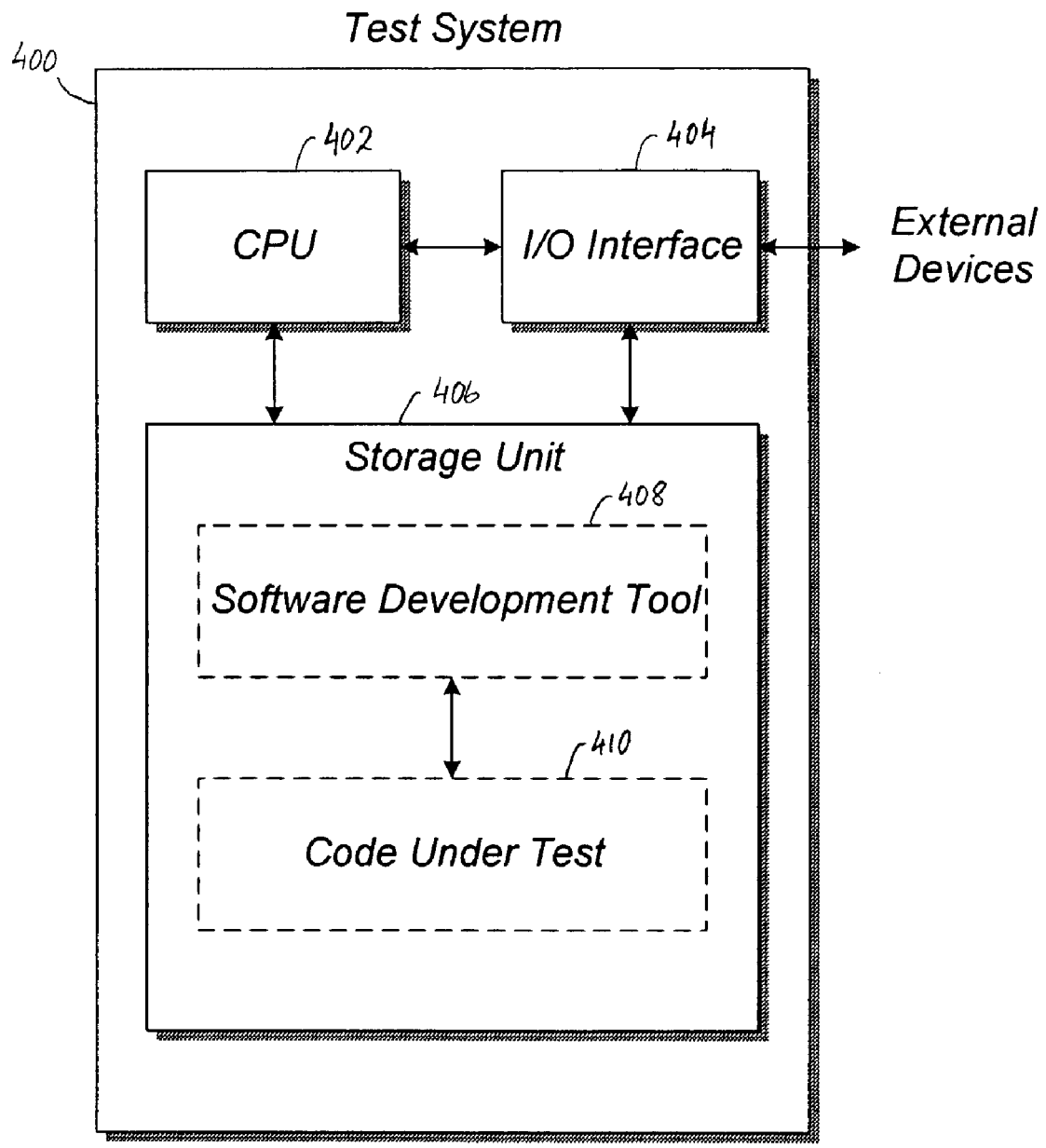
FIG. 4 illustrates another exemplary system in which the bi-directional software probe according to embodiments of the invention may be implemented.

In some embodiments, however, the tester and the device under test are implemented as a single, integrated test system that performs both functions. FIG. 4 illustrates an example of such a test system 400. The integrated test system 400 has a number of functional components, including a CPU 402, an input/output interface 404, and a storage unit 406. These components are similar to their counterparts described with respect to FIG. 3, except that the storage unit 406 has both a software development tool 408 and a code under test 410 stored thereon. Thus, the test system 400 preferably has sufficient storage and processing capacity to execute both the software development tool 408 and the code under test 410 at the same time (i.e., multitasking). The software development tool 408 is essentially the same as the software development tool 312 described above, including a probe control and analysis module (not expressly shown). Likewise, the code under test 410 is essentially the same as the code under test 322 described above, including the probed source code and probe instructions and implementation.

Figure 5:
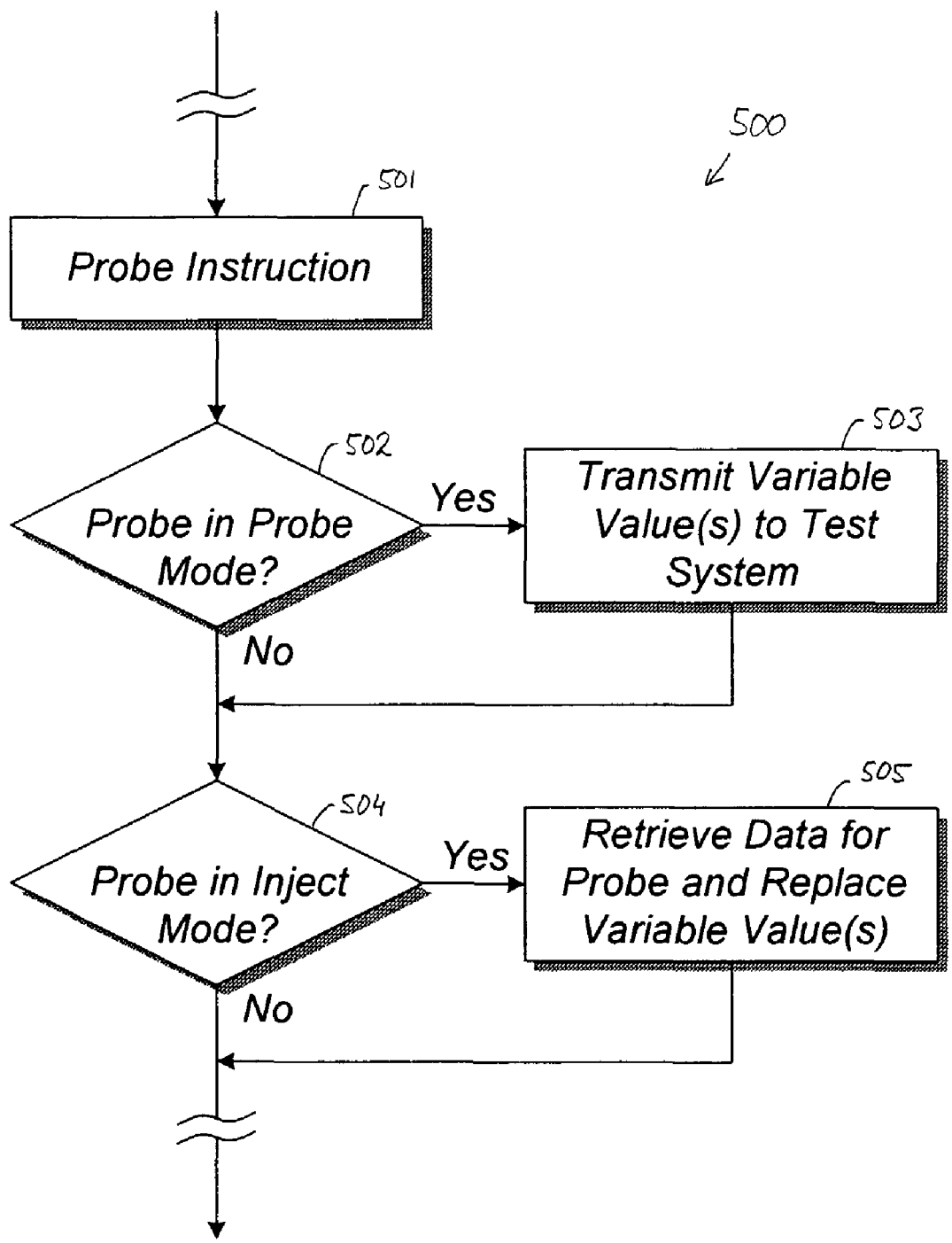
FIG. 5 illustrates an exemplary method of implementing the bi-directional software probe according to embodiments of the invention.

Execution of a bi-directional probe instruction is illustrated in the exemplary method 500 of FIG. 5, according to embodiments of the invention. Such a method 500 is usually implemented on the device under test that is executing the code under test, or an integrated tester system in a multitasking environment. In the method 500, a block of source code that includes one or more probe instructions is in the process of being executed. At a certain point during the execution of the code, step 501, one of the probe instructions is encountered. At the next step, step 502, a determination is made as to whether the probe has been set in the probe mode. The particular mode is usually set by a user via the tester from the software development tool 312, either as a preprogrammed command or manually, or a combination of both. If the answer is yes, then at the third step 503, the data within the memory or storage area indicated by the probe instruction is transmitted to the test system where it can be monitored and analyzed as needed. If no, then the method 500 continues to the fourth step 504, where a determination is made as to whether the probe has been set in inject mode. If the answer is yes, then at the fifth step 505, the data in the memory or storage area indicated by the probe instruction is revised and/or replaced with new data received from test system using, for example, a simple memory copy. If no, then the method 500 continues with execution of the rest of the code under test.

Note that the method 500 described above is a simplified implementation of the probe instruction. In some embodiments, in addition to determining the probing mode, the type of the data as well as its size are verified. It is also possible to probe more complicated variables such as arrays and even variables that are not stored in a continuous structure. In this manner, many types of data may be captured from, as well as inserted into, the software while it is being tested.

While particular embodiments and applications of the present invention have been illustrated and described, it is to be understood that the invention is not limited to the precise construction and compositions disclosed herein, and that modifications and variations may be made to the foregoing without departing from the scope of the invention as defined in the appended claims.

What is claimed is:

1. A software testing method comprising the steps of: providing software having a plurality of data variables and function arguments, wherein the software is software to be tested for errors; executing the software to be tested for errors; and while the software is executing, and without halting the execution, changing or replacing, within the software to be tested for errors, the data variables or function arguments during the testing process by: identifying an address location for at least one of the data variables or function arguments used by the software; outputting any data variables or function arguments stored in the address location to a test system to thereby monitor the data variables or function arguments; and inputting other data variables or function arguments from the test system into the address location to thereby replace any data variables or function arguments previously stored in the address location, wherein the data inputted into the address location is generated based on the data outputted from the address location during a previous iteration and the data inputted into the address location comprises a test vector of data generated based on data outputted from the address location during a previous iteration.

2. The method according to claim 1, wherein the data inputted into the address location is a revised version of the data outputted from the address location.

3. The method according to claim 1, wherein the data inputted into the address location is the same as the data outputted from the address location.

4. The method according to claim 1, wherein the address location identifies a storage location in a computer memory.

5. The method according to claim 1, wherein the address location identifies a storage location in a hard drive.

6. An apparatus for testing software, comprising: a central processing unit; a storage unit connected to the central processing unit; computer readable instructions stored in the storage unit adapted to instruct the central processing unit to: execute software having a plurality of data variables or function arguments, wherein the software is software to be tested for errors; and while the software is executing, and without halting the execution: identify an address location for at least one of the data variables or function arguments used by the software to be tested for errors; output any data variables or function arguments stored in the address location to the central processing unit to thereby monitor the data; and input data variables of function arguments from the central processing unit into the address location to thereby replace or change any data previously stored in the address location, wherein the data inputted into the address location is generated based on the data outputted from the address location during a previous iteration, and the data inputted into the address location comprises a test vector of data generated based on data outputted from the address location during a previous iteration.

7. The apparatus according to claim 6, wherein the data inputted into the address location is a revised version of the data outputted from the address location.

8. The apparatus according to claim 6, wherein the data inputted into the address location is the same as the data outputted from the address location.

9. The apparatus according to claim 6, wherein the address location identifies a storage location in a computer memory.

10. The apparatus according to claim 6, wherein the address location identifies a storage location in a hard drive.

11. A system for testing software, comprising: a device under test configured to execute software having a plurality of data variables or function arguments and one or more probe instructions in the software wherein the software is software to be tested for errors; a tester connected to the device under test, the tester configured to control the device under test so that when a probe instruction is executed, the device under test will, while the software is executing, and without halting the execution thereof, change or replace, within the software to be tested for errors, the data variables or function arguments during the testing process using: means to identify an address location for at least one of the variables or arguments used by the software; means to output any data stored in the address location to the tester; and means to input data received from the tester into the address location, wherein the data inputted into the address location is generated based on the data outputted from the address location during a previous iteration, and the data inputted into the address location comprises a test vector of data generated based on data outputted from the address location during a previous iteration.

12. The system according to claim 11, wherein the data inputted into the address location is a revised version of the data outputted from the address location.

13. The system according to claim 11, wherein the data inputted into the address location is the same as the data outputted from the address location.

14. The system according to claim 11, wherein the address location identifies a storage location in a computer memory.

15. The system according to claim 11, wherein the address location identifies a storage location in a hard drive.

16. The system according to claim 11, wherein the tester and the device under test reside in a single unit.

* * * * *